United States Patent [19]

Cape

[11] 4,200,457
[45] Apr. 29, 1980

[54] FERROUS BASE ALLOY FOR HARD FACING

[76] Inventor: Arthur T. Cape, 580 El Dorado, Monterey, Calif. 93940

[21] Appl. No.: 4,993

[22] Filed: Jan. 22, 1979

[51] Int. Cl.² .................... C22C 38/44; C22C 38/46; C22C 38/54; C22C 38/56

[52] U.S. Cl. ................... 75/122; 75/128 D; 75/128 F; 75/128 W; 75/128 V

[58] Field of Search ............... 75/134 P, 122, 128 V, 75/128 D, 128 W, 128 F.; 228/203

[56] References Cited

U.S. PATENT DOCUMENTS

| | | | |
|---|---|---|---|
| 2,292,740 | 8/1942 | Cape et al. | 148/38 |
| 3,235,417 | 2/1966 | Roy et al. | 75/128 D |
| 3,334,996 | 8/1967 | Foster et al. | 75/128 F |
| 3,969,111 | 7/1976 | Acuncius et al. | 148/32.5 |

OTHER PUBLICATIONS

"Phacomp Revisited", Murphy et al., Journal of Metals, 11/68, pp. 46–53.

*Primary Examiner*—Arthur J. Steiner
*Attorney, Agent, or Firm*—William Isler

[57] ABSTRACT

A ferrous base alloy is disclosed, which is especially adapted for use as a hard facing or coating for poppet valves and the like. The alloy is characterized by the fact that it has an electron vacancy value or Nv number within the range of from about 1.75 to about 2.60.

2 Claims, No Drawings

FERROUS BASE ALLOY FOR HARD FACING

This invention relates, as indicated, to a ferrous base alloy consisting essentially of carbon, chromium, nickel, molybdenum, vanadium and tungsten, with the remainder or balance substantially all iron.

In U.S. Pat. No. 2,292,740, a weld rod is disclosed for use in hard facing various articles, which have been subjected to wear and abrasion.

The weld rod is made from a ferrous alloy consisting of from 1 to 2% carbon, from 23 to 27% chromium, from 10 to 14% nickel and from 6 to 10% molybdenum, the balance of the alloy being substantially all iron.

I have found, through extensive experimentation, that an alloy of this character can be greatly improved for certain purposes, as for example, for coating the working surfaces of poppet valves, where exceptional strength is required in the alloy, by restricting the content of the alloy to electron vacancy values within the range of from about 1.75 to about 2.60, and by modifying the alloy in certain other respects.

The subject of "electron vacancy numbers" or "Nv numbers" is discussed in an article entitled "Phacomp Revisted", by H. J. Murphy, C. T. Sims and A. M. Beltran, which appears in the November 1968 issue of Journal of Metals, and is also discussed in several patents, as for example, U.S. Pat. No. 3,969,111 issued July 13, 1976.

The alloy, in accordance with the invention, consists of the following ingredients, in the proportions by weight stated and having electron vacancy values the range of from about 1.75 to about 2.60.

|  | Range | Preferred |
| --- | --- | --- |
| Carbon | 0.70 to 2.25% | 0.8% |
| Chromium | 25 to 30% | 28% |
| Nickel | 8 to 15% | 11% |
| Molybdenum | 5 to 9% | 5.5% |
| Boron | 0.01 to 0.5% | 0.1% |
| Vanadium | 2.5 to 7% | 3.35% |
| Tungsten | 1.5 to 4% | 2% |
| Iron | Remainder | Remainder |

It is to be understood that the expression "the balance being substantially all iron", as used in the claims, is intended to include additions or rare earth metals, such as cerium and/or lanthanum, in a total amount not to exceed 0.5%.

The higher the electron vacancy value, or Nv number, the greater the strength of the alloy.

It is to be further understood that slight changes may be made in the alloy without departing from the spirit of the invention or the scope of the subjoined claims.

Having thus described my invention, I claim:

1. A ferrous base alloy consisting of from about 0.70 to about 2.25% by weight of carbon, about 25 to about 30% by weight of chromium, from about 8 to about 15% by weight of nickel, from about 5 to about 9% by weight of molybdenum, from about 0.01 to about 0.5% by weight of boron, from about 2.5 to about 7% by weight of vanadium, from about 0.5 to about 4% by weight of tungsten and the balance substantially all iron, said alloy having an electron vacancy value or Nv number within the range of from about 1.75 to about 2.60.

2. A ferrous base alloy consisting of about 0.8% by weight of carbon, about 28% by weight of chromium, about 11% by weight of nickel, about 5.5% by weight of molybdenum, about 0.1% by weight of boron, about 3.35% by weight of vanadium, about 2% by weight of tungsten, and the balance substantially all iron, said alloy having an electron vacancy value or Nv number of about 1.88.

* * * * *